United States Patent [19]

Vernier et al.

[11] Patent Number: 5,549,365
[45] Date of Patent: Aug. 27, 1996

[54] CONTROL DEVICE AND METHOD FOR TRACTION OR BRAKING

[75] Inventors: Jean-Pierre Vernier, Tarbes; Marc Perret, Combs la Ville; Didier Garret, Chevremont; Philippe Chappet, Cravanche, all of France

[73] Assignee: GEC Alsthon Transport SA, Paris, France

[21] Appl. No.: 479,771

[22] Filed: Jun. 7, 1995

[30] Foreign Application Priority Data

Jun. 14, 1994 [FR] France ................... 94 07233

[51] Int. Cl.$^6$ ................................ B60T 13/68
[52] U.S. Cl. ................................ 303/20; 303/3
[58] Field of Search ............ 246/182 R, 182 A, 246/182 B, 187 C; 303/15, 20, 1, 3, 50–54; 188/1.11, 382; 74/483 R; 192/12 R

[56] References Cited

U.S. PATENT DOCUMENTS

| 4,796,480 | 1/1989 | Amos et al. |
| 5,412,572 | 5/1995 | Root et al. ........... 303/15 |
| 5,415,465 | 5/1995 | Skantar et al. ........... 303/20 |

FOREIGN PATENT DOCUMENTS

0473512A1  3/1992  European Pat. Off. .

2512466  10/1976  Germany .

Primary Examiner—Douglas C. Butler
Attorney, Agent, or Firm—Sughrue, Mion, Zinn, Macpeak & Seas

[57] ABSTRACT

A control device and corresponding method for controlling a traction function or a braking function of a vehicle, including a moving control lever which can be set in a first position 0 in which neither the traction function nor the braking function are activated, and an unstable position 0i in which the vehicle coasts by reducing electrical traction force and electrical braking force to zero. The control lever can be moved from the first position 0 over a first zone 0+ in which the electrical traction function is activated, either by increasing the electrical traction force, or by decreasing the electrical braking force. The control lever further can be moved from the first position 0 over a second zone 0– in which the electrical braking function is activated, either by decreasing the electrical traction force, or by increasing the electrical braking force. Additionally, the control lever can be moved from a—end of the second zone 0– over a third zone –F in which a pneumatic braking function of the vehicle is activated, and can be set in a second position EM, following the third zone –F, in which both the electrical braking function and the pneumatic braking function are activated simultaneously.

11 Claims, 1 Drawing Sheet

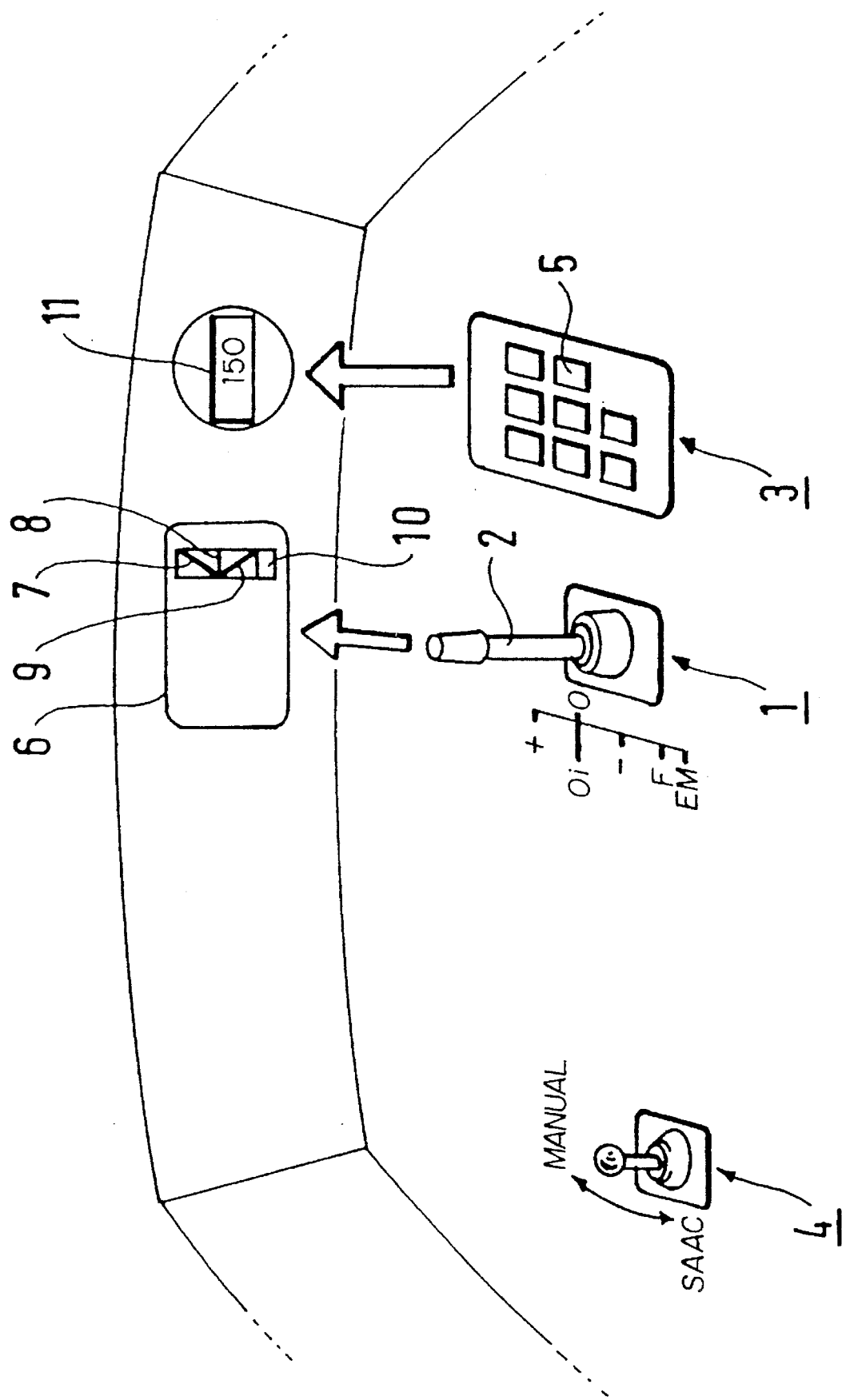

CONTROL DEVICE AND METHOD FOR TRACTION OR BRAKING

FIELD OF THE INVENTION

The present invention relates generally to organizing the controls on instrument panels in vehicles, especially rail vehicles.

The present invention also relates to combined control of at least two sub-assemblies, namely controlling both a motor and a braking system of a vehicle, especially a rail vehicle.

The present invention relates more particularly to a control device for controlling traction or braking of a vehicle, especially a rail vehicle.

The present invention also relates to a method of implementing the control device for controlling traction or braking of a vehicle, especially a rail vehicle.

BACKGROUND OF THE INVENTION

Known state-of-the-art traction-and-braking control systems require at least two control means.

A first control means is assigned to activating traction and electrical braking.

A second control means is assigned to activating pneumatic braking.

A third control means is usually assigned to emergency braking, namely to activating all of the available braking systems.

Such control systems suffer from the major drawback of requiring at least two distinct control means, and generally three distinct control means, and this increases the possibilities of human error during degraded situations by offering the driver a multitude of possible strategies and procedures for regulating speed.

Another drawback of such prior art control systems is that they potentially make it possible for the speed set by the driver to be exceeded.

Another drawback of such prior art control systems is that they are deemed complex to use.

Another drawback of such prior art control systems is that they require a large number of operations in order to go from rheostatic braking to pneumatic braking alone, or from traction to electrical braking.

Another drawback of such prior art control systems is that they give rise to postural discomfort due to control operations that require movement over large amplitudes.

Another drawback of such prior art control systems is the very large amount of space required for the traction and braking controls.

Another drawback of such prior art control systems is that no safety mechanism makes it possible to avoid the control from being accidentally moved off its setting.

OBJECTS AND SUMMARY OF THE INVENTION

Therefore, an object of the invention is to provide a control device for controlling traction or braking of a vehicle that simplifies implementing the vehicle traction or braking functions.

Another object of the invention is to provide a control device for controlling traction or braking of a vehicle that makes driving of the vehicle automatic over certain predetermined portions of line.

The invention provides a control device for controlling traction or braking of a vehicle, in particular a rail vehicle, said control device including a moving control lever capable of:

being positioned in a first position 0 in which neither the traction function nor the braking function are activated;

being held in an unstable position 0i in which the vehicle coasts by reducing the electrical traction force and the electrical braking force to zero;

travelling over a first zone 0+, from said first position 0, over which zone the electrical traction function is activated, either by increasing the electrical traction force, or by decreasing the electrical braking force;

travelling over a second zone 0−, from said first position 0, over which zone the electrical braking function is activated, either by decreasing the electrical traction force, or by increasing the electrical braking force;

travelling over a third zone −F, from the—end of said second zone 0−, over which third zone the pneumatic braking function is activated; and being positioned in a second position EM, following said third zone −F, in which both the electrical braking function and the pneumatic braking function are activated simultaneously.

The invention also provides a control device associated with a limit speed setting device enabling a limit speed to be selected so as to limit the speed while guaranteeing that the speed of the vehicle is maintained automatically at the limit speed.

The invention also provides a control device associated with a switch having two positions MANUAL & AUTO enabling the driving mode to be selected.

The invention also provides a control device associated with an automatic driving-assistance system enabling the vehicle to be put on automatic pilot.

The invention also provides a control device associated with said automatic driving-assistance system which offers any one of the following options:

driving at the maximum speed allowed by the line;

driving at a percentage of the maximum speed of the line; or driving at timetable speeds.

The invention also provides a control device associated with a first display device enabling the traction force and braking force levels to be displayed.

The invention also provides a control device associated with said display device which includes a zone for displaying the electrical traction force, a central zone for displaying zero force, a zone for displaying the electrical braking force, and a zone for displaying pneumatic braking and emergency braking.

The invention also provides a control device associated with a second display device enabling the selected and confirmed limit speed to be displayed.

The invention also provides a method of implementing the control device for controlling traction or braking of a vehicle, said method including the following steps:

de-activating the traction function and the braking function when the control lever is positioned in a first position 0;

activating coasting of the vehicle, when the control lever is held in an unstable position 0i, by reducing the electrical traction force and the electrical braking force to zero;

activating the traction function when the control lever travels over a first zone 0+, from said first position 0, either by increasing the electrical traction force, or by decreasing the electrical braking force;

activating the electrical braking function when the control lever travels over a second zone 0– from said first position 0, either by deceasing the electrical traction force, or by increasing the electrical braking force;

activating the pneumatic braking function when the control lever travels over a third zone –F, from the –end of said second zone 0–; and activating the electrical braking function and the pneumatic braking function when the control lever is positioned in a second position EM, following said third zone –F.

The method of the invention includes at least one of the following steps:

the traction force or braking force levels are displayed by means of a first display device; and the selected and confirmed limit speed is displayed by means of a second display device.

An advantage of the control device of the invention for controlling traction or braking of a vehicle is that potential for human error while speed is being regulated is reduced to a minimum, and safety is therefore increased.

Another advantage of the control device of the invention for controlling traction or braking of a vehicle is increased driving efficiency.

Another advantage of the control device of the invention for controlling traction or braking of a vehicle is that the mental fatigue of the driver is reduced because the driving procedure is simplified, and information feedback is improved.

Another advantage of the control device of the invention for controlling traction or braking of a vehicle is that physical tiredness of the driver is reduced because postural discomfort is removed.

Another advantage of the control device of the invention for controlling traction or braking of a vehicle is that the driver is assisted so as to provide maximum performance levels on a saturated line having a floating block system or the like.

Another advantage of the control device of the invention for controlling traction or braking of a vehicle is that it offers more freedom to the driver while the driver remains in the power car, and enables the driver to take a break from driving if necessary.

Another advantage of the control device of the invention for controlling traction or braking of a vehicle is that the driver remains master of the driving mode, namely manual or automatic.

BRIEF DESCRIPTION OF THE DRAWINGS

Other objects, characteristics, and advantages of the invention will appear on reading the following description of a preferred embodiment of the control device for controlling traction or braking of a vehicle, given with reference to the accompanying drawings, in which:

the sole FIGURE shows an overall view of a control system equipped with a control device of the invention for controlling traction or braking of a vehicle.

MORE DETAILED DESCRIPTION

More particularly, the sole FIGURE shows the control device 1 of the invention for controlling traction or braking of a vehicle.

The control device 1 for controlling traction or braking of a vehicle, in particular a rail vehicle, comprises a moving lever 2.

The moving lever 2 is capable of being positioned in a first position 0 in which neither the traction function nor the braking function are activated.

The moving lever 2 is also capable of travelling over a first zone 0+, from said first position 0, over which zone the electrical traction function is activated.

The electrical traction function is then activated either by increasing the electrical traction force, or by decreasing the electrical braking force.

The moving lever 2 is also capable of travelling over a second zone 0–, from said first position 0, over which zone the electrical braking function is activated.

The electrical braking function is then activated either by decreasing the electrical traction force, or by increasing the electrical braking force.

The moving lever 2 is also capable of travelling over a third zone –F, from the—end of said second zone 0–, over which third zone the pneumatic braking function is activated.

The moving lever 2 is also capable of being positioned in a second position EM following said third zone –F, in which position both the electrical braking function and the pneumatic braking function are activated simultaneously.

The electrical braking function and the pneumatic braking function are activated simultaneously, normally with maximum pneumatic braking being obtained by connecting a main brake pipe (defined below) to the atmosphere.

In other words, from a stable position 0, zones 0+ and 0– enable the traction force and the braking force to be set.

Going from the traction function to the braking function, and vice versa, takes place naturally when a lower traction force is requested while the traction force is already zero. The brake controlled is the dynamic brake, i.e. the electrical brake.

If the driver wishes to use the braking defined by the main brake pipe, and regardless of whether the vehicle is in traction mode or in braking mode, the driver pulls the control lever 2 beyond position—to the unstable position F.

The main brake pipe causes a pneumatic braking force to be applied when a pressure reduction occurs.

The pneumatic braking force is proportional to the pressure reduction created in the main brake pipe.

The main brake pipe is normally at a pressure of five bars.

By displacing the control lever 2, any traction force is interrupted, and braking is performed by means of the main brake pipe by creating a first pressure reduction $\delta P$.

The first pressure reduction $\delta P$ is a pressure differential that is significant relative to the nominal pressure of the main brake pipe, and that causes a first application of the pneumatic braking.

If the vehicle is already being dynamically braked, the level of force remains at least at the value that it has at that time. The pressure in the main brake pipe is adjusted by causing the lever to travel over the + or – zones.

Whether the vehicle is in traction, in dynamic braking, or in braking by means of the main brake pipe, passing to an unstable position 0i leaves the vehicle to coast, i.e. to continue on its acquired speed, by reducing the electrical force set-point to zero.

For example, this unstable position 0i faces the first position 0 which is a stable position.

Beyond position F lies stable position EM.

The control device 1 of the invention for controlling traction or braking of a vehicle therefore enables traction or braking to be controlled entirely manually at the discretion of the driver.

The control device 1 of the invention may be supplemented by a setting device 3 for setting the limit speed, and making it possible for the driver to select a limit speed. The purpose of such a limit speed setting device 3 is to limit speed while guaranteeing that the speed of the vehicle is maintained automatically at the limit speed. As a result, a speed regulation function is provided, the speed of the vehicle then being not more than the limit speed, even when the vehicle is coasting, and regardless of the position of the control lever 2.

The control device 1 of the invention may also be supplemented by an automatic driving-assistance system (known in French under the acronym SAAC for "Système Automatique d'Assistance à la Conduite") which can be activated by the driver, on lines that are equipped with the system, and which makes it possible to put the vehicle on automatic pilot.

Such an automatic driving-assistance system may offer several options, namely:
  driving at the maximum speed allowed by the line;
  driving at a percentage of the maximum speed of the line; or
  driving at timetable speeds.

The control device of the invention also makes it possible to use independently either the braking potential of the power cars only, or the braking potential of the entire train.

The control device of the invention also makes it possible to provide emergency control.

The driving mode is selected by means of a switch 4 having two positions MANUAL and AUTO.

In the MANUAL position, the automatic control associated with the limit speed setting device 3 is capable of activating the entire dynamic brake (not shown), regardless of the type (traction or braking) and the value of the force requested by the control lever 2.

The dynamic brake is sufficient for holding braking on a slope of 1 in 30.

In order to drive in "limit speed" mode, it is necessary to set the limit speed to the desired value by means of the limit speed setting device 3, and to set the desired traction force by means of the control device 1.

The limit speed mode can be used only for speeds higher than 30 km/h, except for driving uncoupled, and therefore on the flat, which corresponds to a limit speed of 5 km/h.

Below 30 km/h, the dynamic brake cannot guarantee that the limit speed is complied with on steep slopes.

In the AUTO position, the automatic control associated with the limit speed setting device 3 is capable of activating all of the brakes.

For example, the limit speed is selected by means of a keypad 5 on the limit speed setting device 3.

By way of example, the driver enters the value of the speed, and then confirms the entered speed. The preceding selected value remains valid so long as the newly entered value has not been confirmed.

The traction force or braking force levels are displayed on a first display device 6, preferably by using symbols.

The display device 6 includes a zone 7 for displaying the traction force, a central zone 8 for displaying zero force, a zone 9 for displaying the braking force, and a zone 10 for displaying the emergency braking.

The selected and confirmed limit speed is displayed on a second display device 11, which is preferably a three-digit digital display.

In the event that it is temporarily impossible to comply with the requested limit speed, e.g. in the event that a speed is confirmed that is lower than the speed of the train, the second display device 11 flashes until the limit speed is reached.

The position of the switch 4 for selecting the driving mode displays the choice made.

As indicated above, the invention also relates to a method of implementing the control device for controlling traction or braking of a vehicle.

The method of implementing the control device of the invention for controlling traction or braking of a vehicle includes the following steps:

de-activating the traction function and the braking function when the control lever is positioned in a first position 0;

activating the traction function when the control lever travels over a first zone 0+, from said first position 0;

activating the electrical braking function when the control lever travels over a second zone 0− from said first position 0;

activating the pneumatic braking function when the control lever travels over a third zone −F, from the—end of said second zone 0−; and activating the electrical braking function and the pneumatic braking function when the control lever is positioned in a second position EM, following said third zone −F.

In the method, the traction force or braking force levels are displayed by means of a first display device 6.

Also in the method, the selected and confirmed limit speed is displayed by means of a second display device 11.

We claim:

1. A control device for controlling a traction function or a braking function of a vehicle, said control device including a moving control lever, comprising:

apparatus which enables said moving control lever to set in a first position 0 in which neither the traction function nor the braking function are activated;

apparatus which enables said moving control lever to set in an unstable position 0i in which the vehicle coasts by reducing electrical traction force and electrical braking force to zero;

apparatus which enables said moving control lever to travel from said first position 0 over a first zone 0+ in which the electrical traction function is activated, either by increasing the electrical traction force or by decreasing the electrical braking force;

apparatus which enables said moving control lever to travel from said first position 0 over a second zone 0− in which the electrical braking function is activated, either by decreasing the electrical traction force or by increasing the electrical braking force;

apparatus which enables said moving control lever to travel from a—end of the second zone 0− over a third zone −F in which a pneumatic braking function of said vehicle is activated; and apparatus which enables said moving control lever to set in a second position EM, following said third zone −F, in which both the electrical braking function and the pneumatic braking function are activated simultaneously.

2. A control device according to claim 1, further comprising a limit speed setting device which enables setting of a limit speed to maintain a speed of the vehicle at the limit speed.

3. A control device according to claim 1, further comprising a switch having two positions MANUAL & AUTO which enables selection of a driving mode of said vehicle.

4. A control device according to claim 1, further comprising a switching device which activates an automatic driving-assistance system which enables operation of the vehicle on automatic pilot.

5. A control device according to claim 4, wherein said switching device activates said automatic driving-assistance system to enable operation of the vehicle in any one of the following manners:

driving at a maximum speed allowed for a line on which the vehicle is driven;

driving at a percentage of the maximum speed for the line; or driving at timetable speeds.

6. A control device according to claim 1, further comprising a first display device which enables display of levels of the traction force and braking force.

7. A control device according to claim 6, wherein said display device includes a zone for displaying the electrical traction force, a central zone for displaying zero force, a zone for displaying the electrical braking force, and a zone for displaying pneumatic braking and emergency braking.

8. A control device according to claim 1, further comprising a second display device which enables display of the set and confirmed limit speed.

9. A method of implementing a control lever for controlling a traction function or a braking function of a vehicle, including the steps of:

positioning the control lever in a first position 0 to de-activate the traction function and the braking function;

positioning the control lever in an unstable position 0i to activate coasting of the vehicle by reducing electrical traction force and electrical braking force to zero;

moving the control lever from said first position 0 over a first zone 0+ to activate the traction function by either increasing the electrical traction force or decreasing the electrical braking force;

moving the control lever from said first position 0 over a second zone 0– to activate the electrical braking function by either decreasing the electrical traction force or increasing the electrical braking force;

moving the control lever from a—end of said second zone over a third zone –F to activate a pneumatic braking function; and positioning the control lever in a second position EM following said third zone –F to activate the electrical braking function and the pneumatic braking function.

10. A method according to claim 9, further comprising a step of displaying, on a first display device, levels of the traction force or braking force.

11. A method according to claim 9, further comprising a step of displaying, on a second display device, a selected and confirmed limit speed of the vehicle.

* * * * *